United States Patent
Furbeck et al.

(10) Patent No.: US 9,076,116 B2
(45) Date of Patent: Jul. 7, 2015

(54) ALPHA-CHAIN CONSTRAINTS FOR PROCESS PLANNING

(71) Applicant: The Boeing Company, Seal Beach, CA (US)

(72) Inventors: Warren R. Furbeck, Mercer Island, WA (US); David L. Grose, Poulsbo, WA (US); Thomas E. Sherer, Everett, WA (US); Scott D. Button, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 160 days.

(21) Appl. No.: 13/758,353

(22) Filed: Feb. 4, 2013

(65) Prior Publication Data

US 2014/0222492 A1    Aug. 7, 2014

(51) Int. Cl.
*G06Q 10/00*    (2012.01)
*G06Q 10/06*    (2012.01)

(52) U.S. Cl.
CPC .......... *G06Q 10/06316* (2013.01); *G06Q 10/06* (2013.01)

(58) Field of Classification Search
CPC . G06Q 10/06; G06Q 10/10; G05B 19/41865; G05B 2219/32088; G05B 2219/32107; G05B 2219/32109; G06F 17/2247
USPC ...................... 700/97; 705/7.11; 709/223, 231
See application file for complete search history.

(56) References Cited

U.S. PATENT DOCUMENTS

| | | | |
|---|---|---|---|
| 6,023,702 A * | 2/2000 | Leisten et al. ........................ | 1/1 |
| 6,141,776 A | 10/2000 | Grose et al. | |
| 6,332,163 B1 * | 12/2001 | Bowman-Amuah .......... | 709/231 |
| 6,473,794 B1 * | 10/2002 | Guheen et al. ................. | 709/223 |
| 6,523,027 B1 * | 2/2003 | Underwood .......................... | 1/1 |
| 6,718,535 B1 * | 4/2004 | Underwood .................... | 717/101 |
| 7,551,975 B2 * | 6/2009 | Steinbach et al. .............. | 700/97 |
| 7,873,920 B2 | 1/2011 | Grose et al. | |
| 7,899,768 B2 | 3/2011 | Grose et al. | |
| 2003/0182052 A1 * | 9/2003 | DeLorme et al. ............. | 701/201 |
| 2004/0006566 A1 * | 1/2004 | Taylor et al. .................. | 707/100 |

(Continued)

OTHER PUBLICATIONS

Leymann, Frank, and Dieter Roller. "Workflow-based applications." IBM Systems Journal 36.1 (1997): 102-123.*

(Continued)

*Primary Examiner* — Gurkanwaljit Singh
(74) *Attorney, Agent, or Firm* — Womble Carlyle Sandridge & Rice, LLP

(57) ABSTRACT

A method is provided that includes receiving process-related information describing a process for production of a product, including a logical sequence of tasks to produce respective internal products of the process. The method also includes constructing a schedule for the process based on the process-related information, with the process schedule being for execution of at least some of the tasks each of which utilizes or requires inputs including temporally a last input. Construction of the process schedule includes separating each of at least some of the respective tasks into a closure portion that requires availability of the last input of its task before being initiated, and a distinct precursor portion capable of being initiated before the respective last input is available. The closure portions of the respective tasks may be temporally sequenced without intervening precursor portions, and the precursor portions may be prepended to respective, temporally-sequenced closure portions.

24 Claims, 9 Drawing Sheets

(56) References Cited

U.S. PATENT DOCUMENTS

| | | | |
|---|---|---|---|
| 2004/0064351 A1* | 4/2004 | Mikurak | 705/7 |
| 2004/0107125 A1* | 6/2004 | Guheen et al. | 705/7 |
| 2005/0243604 A1* | 11/2005 | Harken et al. | 365/185.22 |
| 2005/0251533 A1* | 11/2005 | Harken et al. | 707/104.1 |
| 2006/0080338 A1* | 4/2006 | Seubert et al. | 707/100 |
| 2006/0129970 A1 | 6/2006 | Haas et al. | |
| 2007/0067196 A1* | 3/2007 | Usui | 705/8 |
| 2007/0106410 A1 | 5/2007 | Bouffiou et al. | |
| 2007/0150387 A1* | 6/2007 | Seubert et al. | 705/31 |
| 2008/0154411 A1* | 6/2008 | Steinbach et al. | 700/97 |
| 2008/0154412 A1* | 6/2008 | Steinbach et al. | 700/97 |
| 2008/0154660 A1* | 6/2008 | Steinbach et al. | 705/7 |
| 2008/0319719 A1 | 12/2008 | Grose et al. | |
| 2009/0069920 A1 | 3/2009 | Franzen et al. | |
| 2010/0004916 A1 | 1/2010 | Stauder et al. | |
| 2011/0022208 A1 | 1/2011 | Bouffiou et al. | |
| 2012/0050287 A1 | 3/2012 | Grose et al. | |
| 2012/0330869 A1* | 12/2012 | Durham | 706/16 |
| 2013/0106682 A1* | 5/2013 | Davis et al. | 345/156 |
| 2013/0185119 A1* | 7/2013 | Palao et al. | 705/7.36 |
| 2013/0246032 A1* | 9/2013 | El-Bakry et al. | 703/10 |

OTHER PUBLICATIONS

Georgakopoulos, Dimitrios, and Aphrodite Tsalgatidou. "Technology and tools for comprehensive business process lifecycle management." Workflow Management Systems and Interoperability. Springer Berlin Heidelberg, 1998. 356-395.*

Heindel, Lee E., and Vincent A. Kasten. "Next generation PC-based project management systems: the path forward." International Journal of Project Management 14.4 (1996): 249-253.*

Lee E Heindel, Vincent A Kasten, Next generation PC-based project management systems: implementation considerations, International Journal of Project Management, vol. 14, Issue 5, Oct. 1996, pp. 307-309, ISSN 0263-7863.*

Nakashima, Yusei, Noriaki Daito, and Satoru Fujita. "Integrated expert system with object-oriented database management system." Systems and computers in Japan 23.11 (1992): 29-40.*

Ludäscher, Bertram, et al. "Scientific process automation and workflow management." Scientific Data Management: Challenges, Existing Technology, and Deployment, Computational Science Series 230 (2009): 476-508.*

Stavness, Nicole Ann. Supporting flexible workflow processes with a progression model. Diss. University of Saskatchewan Saskatoon, 2005.*

Christ David, Theory of Constraints Project Management in Aircraft Assembly, Sep. 10, 2001, 26 pgs.

Newbold Rob, Scheduling for Success with Critical Chain, ProChain Solutions, Inc., Sep. 2010, 14 pgs.

European Search Report dated Apr. 3, 2014 for European Application No. 14 152 519.6, 10 pages.

Goldratt, Eliyaha M., "The Strategy & Tactic tree—Projects—Viable-Visio implementations," *Goldratt Consulting*, 2008, pp. 1-85; http://public.wsu.edu/~engrmgmt/holt/em534/SandT-Projects.pdf.

* cited by examiner

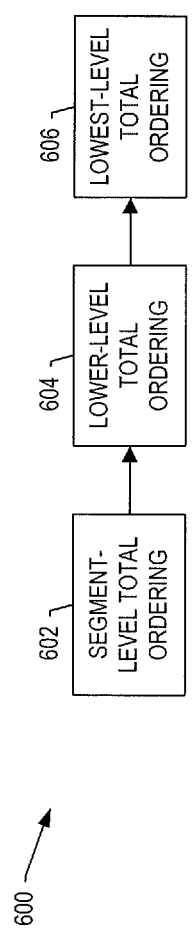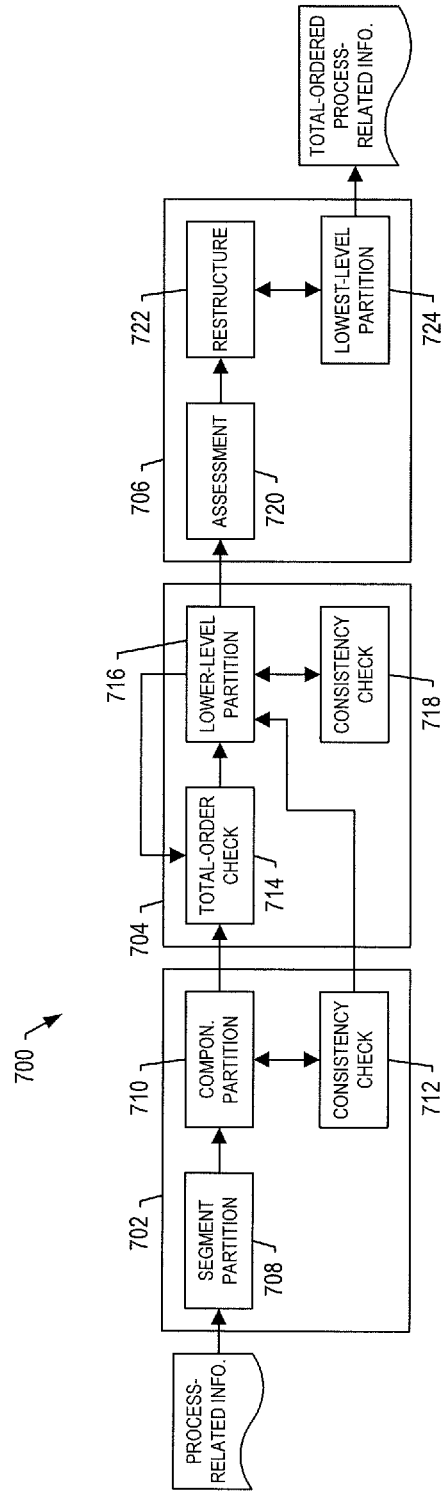
FIG. 6
FIG. 7

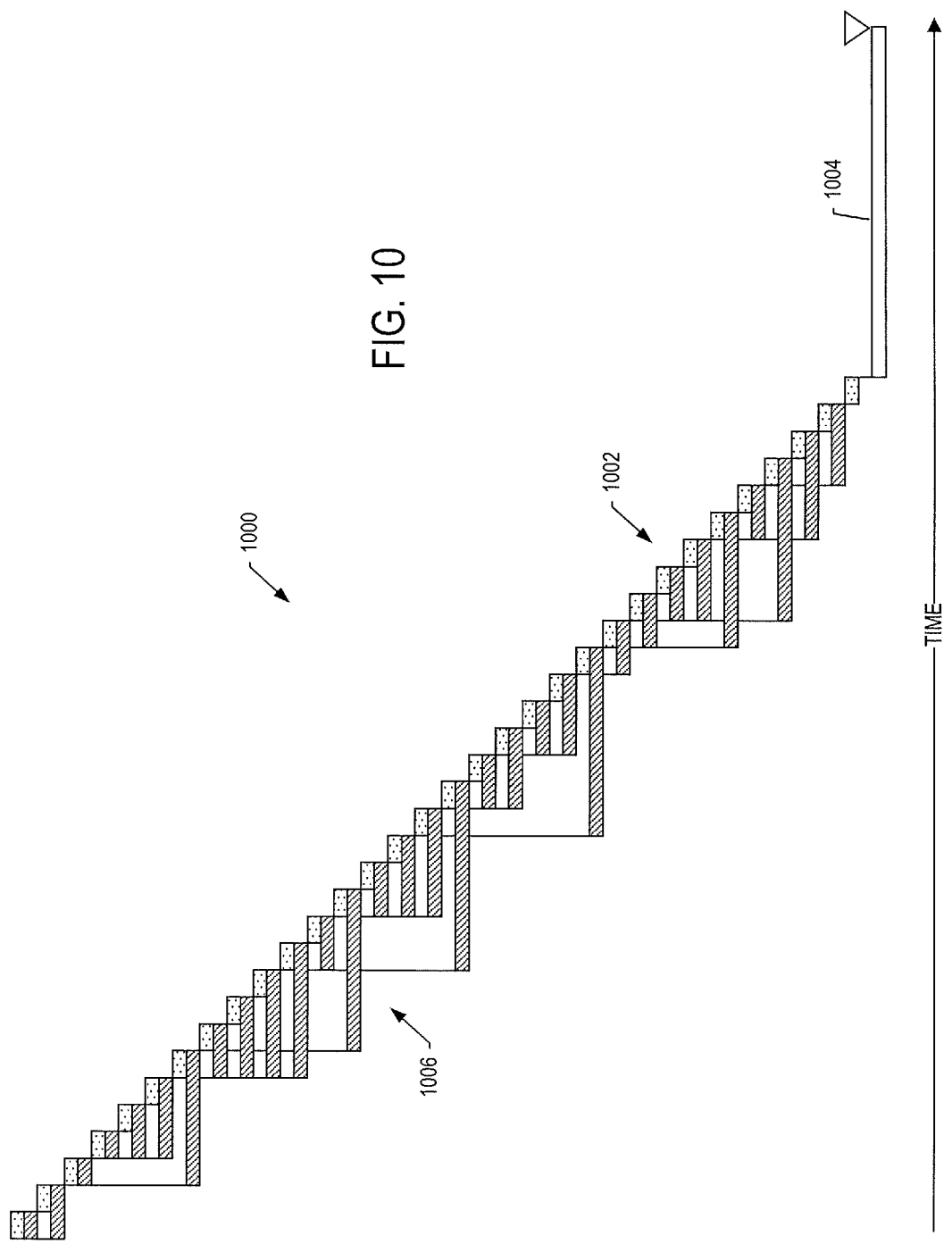

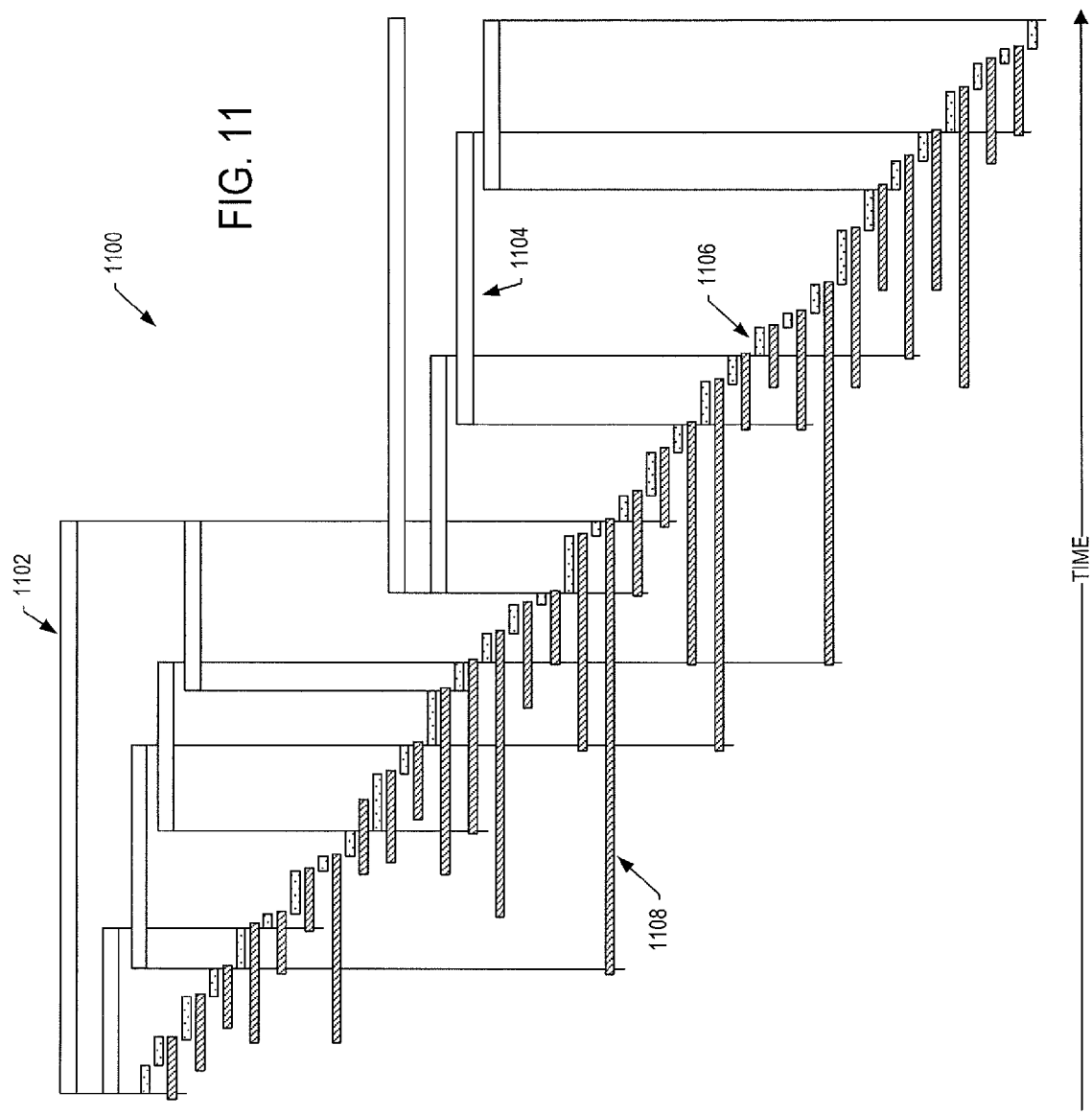

ALPHA-CHAIN CONSTRAINTS FOR PROCESS PLANNING

TECHNOLOGICAL FIELD

The present disclosure relates generally to process planning and, in particular, to providing a constraint basis for stochastic processing planning models.

BACKGROUND

Complex projects such as the planning and production of large commercial or military aircraft require the scheduling and coordination of a plurality of resources. The resources to be coordinated may include materials, component parts, personnel, machinery and factory floor space, in addition to other resources. Integration and coordination is particularly important in complex projects since higher-order effects and interactions can adversely affect the cost of the project, the time required for completion of the project, and the risk of failure to deliver the required content. In addition, other variables of importance such as the overall efficiency of the project need to be modeled and measured.

In a number of known methods, the planning process generally includes the processing of input data that defines task dependencies and estimated task durations. Task dependencies generally express relationships between various tasks, so that the various tasks may be properly ordered. For example, in the construction of large commercial aircraft, a material such as an aluminum sheet material must be procured before fuselage panels may be fabricated. The input data may be processed in accordance with a number of different techniques to arrange the various tasks into an ordered set. In some cases, a multiplicity of different paths may result from processing the input data, which may include multiple paths that could end up being critical. The critical path may be the sequence of tasks throughout the project that determines its duration, and may be the path with the least amount of scheduling flexibility (float). Accordingly, it is the path along which no delay in the provision of a necessary resource may occur without delaying the entire project, and is thus of central importance in project execution. The manufacturing process may therefore be analyzed based upon relationships between the various individual tasks comprising the process, and upon a critical path for the process. The critical path may shift from a first task set to another task set as resource delays occur and/or task durations vary from their estimated values. Accordingly, the critical path is not fixed, and may change.

Although existing process planning methods are useful, they nevertheless exhibit several drawbacks, and thus may not accurately represent a selected process. Existing methods of process planning rely on discrete schedule estimates and task precedence relationships rather than the data-driven relationships in the network of deliverables. As such, they devolve into a schedule-based (as opposed to process-based) planning approach. Plans or models based on these existing methods are less robust, in adapting to variation in the durations of planned activities, and how the interactions between activities are modeled. For example, the different estimating methods utilized for scheduling purposes may be one such source of variation. As activities are executed, compounding sources of variation may contribute to deviations in the planned durations. Further, management policies that are designed to focus on schedule performance only may also drive changes in how the interactions of activities are modeled. As a result of these multiple and compounding sources of uncertainty and variation, traditional planning methods are not suitable for application in the automatic generation of computer models for complex process planning and management. And without a capability to recognize and analyze data-driven constraints, the current methods are not capable of producing a robust, predictive model that will support risk assessment and inform decision making that will result in the best possible outcome.

BRIEF SUMMARY

Example implementations of the present disclosure are generally directed to a system, and corresponding method and computer-readable storage medium for providing a constraint basis for stochastic planning models, such as using information from scalable, hierarchical feed forward networks that may also be total-ordered. In contrast to existing process planning techniques, example implementations of the present disclosure may be capable of supporting automated generation of process-based planning models that discriminate constraints in the baseline process. These models may be robust with regard to the sources of variation and uncertainty that undermine schedule-based plans.

Example implementations may provide a number of capabilities that are well suited to the problem of complex process planning and management. Example implementations may provide the capability to define the key relationships that constrain performance of feed-forward networks in terms of a subset of task segments or portions (termed "closure" portions) each of which requires availability of a last of its task's inputs before it may be initiated. This capability to define first-order system constraint in terms of closure portions of functional tasks may have profound implications for planning and management of stochastic systems. For example, it may facilitate planning based on necessary input requirements rather than virtual, schedule-based relationships.

Example implementations may provide the capability to model parallel processing using only finish-to-start relationships, which may have useful benefits in many fields beyond project and program management (e.g., micro-processing routines for computing).

Further, example implementations may provide the capability to account for the majority of task uncertainty via other task segments or portions (termed "precursor" portions) each of which may be initiated before the last of its tasks inputs is available. Since more uncertainty may be captured in precursor portions, one may avoid confounding the constraint path defined by an alpha chain of closure portions. This capability may address many resource management and planning conflicts, and may facilitate resource management scenario planning within target time frames.

Even further, example implementations may provide the capability to resolve conflict over level of detail required in a plan. In this regard, example implementations may be used in a hierarchical approach to rolling wave planning using linked task segments or portions. In accordance with this approach, a project may be planned on a rolling, phase basis only to the detail necessary to execute a current phase. Details for later phases that may be initially unknown and later added as they emerge, using a rolling wave approach. These may be tied back to earlier phases using the appropriate data relationships from a feed-forward network of dependencies.

According to one aspect of example implementations, a method is provided that includes receiving process-related information describing a process for production of a product. The process-related information describes a logical sequence of tasks to produce respective internal products of the process, with at least some of the tasks having a precedence relationship whereby the internal product produced by one task is an input utilized or required by another task. The method also includes constructing a schedule for the process based on the process-related information, with the process schedule being for execution of at least some of the tasks each of which utilizes or requires one or more inputs including temporally at least a last input.

According to this aspect, construction of the process schedule includes separating each of at least some of the respective tasks into a closure portion that requires availability of the last input of its task before being initiated, and a distinct precursor portion capable of being initiated before the respective last input is available. The closure portions of the respective tasks may be temporally sequenced without intervening precursor portions, and the precursor portions may be prepended to respective, temporally-sequenced closure portions.

In one example, constructing the process schedule may further include calculating an average duration for the closure portions based on a time-frame constraint. In this example, the closure portions may be temporally sequenced according to the calculated average duration. Also in this example, calculating the average duration may also include calculating a size of a buffer corresponding to its duration. The temporal sequencing of closure portions, then, may further include temporally sequencing the buffer after a last of the closure portions. Even further to this example, the closure portions may have respective durations based on which the average duration is calculated, with the durations being expressed as unknown probability distributions.

In one example, the tasks may be arranged in a plurality of chains of logically-sequenced tasks. In this example, construction of the process schedule may include separating the respective tasks, temporally sequencing the closure portions and prepending the precursor portions for each of the chains.

In one example, the method may further include compiling at least the process-related information and plan schedule into a plan model.

In one example, the method may further include establishing total-ordering in the process. In this example, the received process-related information based on which the schedule is constructed may be from the total-ordered process.

In other aspects of example implementations, a process-planning system and computer-readable storage medium are provided for planning a process. The features, functions and advantages discussed herein may be achieved independently in various example implementations or may be combined in yet other example implementations further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

FIG. 6 illustrates one example of a total-ordering system in accordance with an example implementation;

FIG. 7 illustrates a more particular example of a total-ordering system in accordance with an example implementation;

FIG. 10 illustrates one suitable Gantt chart for an alpha chain of tasks including closure portions and precursor portions, according to one example implementation; and FIG. 11 illustrates one suitable Gantt chart for an alpha chain of tasks in the context of phased, rolling wave planning, according to one example implementation.

DETAILED DESCRIPTION

Figure 1:
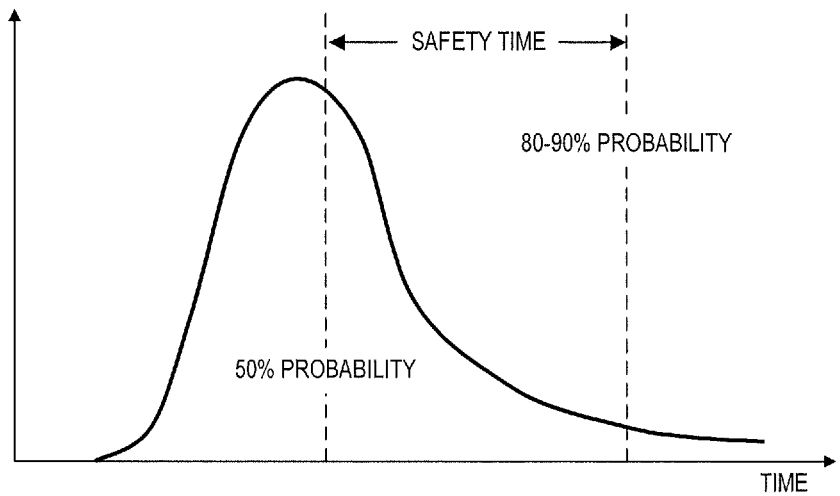
FIG. 1 illustrates a probability distribution for completion of a task of a process in accordance with an example implementation.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Existing methods of process planning usually fall into one of two categories depending on whether they are based on schedules or networks. The simplest, least-capable planning method uses milestones laid out on a timeline to represent a phased view of significant accomplishments or conditions. Another common schedule-based planning approach relates tasks through precedence relationships and uses resource assignments, resource levels and effort or duration estimates to establish a networked project schedule.

Many network-based planning methods develop schedules through estimates of task duration and translation of network relationships into task precedence relationships. These task relationships may be characterized as finish-to-start, finish-to-finish, start-to-start or start-to-finish. Sometimes these relationships include lead or lag time to adjust the phasing of two tasks in a schedule. These planning methods typically include resource assignments and schedule adjustments based on assumptions about resource availability. In more-complicated planning problems, tasks may be subdivided using hierarchical task breakdowns or sub-projects.

Existing methods based on network relationships may utilize or require assessments (estimates) of task durations for each of the tasks in the project network to produce a schedule. The critical-path method (CPM), for example, typically uses a single value for each task duration estimate as a basis for determination of the path with the least amount of slack or float, but this approach is not representative of the stochastic nature of most tasks. In another example, the program evaluation and review technique (PERT) is based on finish-to-start task relationships and addresses the stochastic nature of tasks by using three estimates: a) optimistic, b) most likely, and c)

pessimistic, which for scheduling purposes are converted to a single value by the formula $d=(a+4b+c)/6$.

In yet another example, critical chain project management (CCPM) uses an assumption that the completion distribution for each task can be represented by a distribution. FIG. 1 illustrates an example probability distribution (probability of completion as a function of time) for completion of a task. As shown in this example, the distribution may be positively skewed to reflect a characteristic of the uncertainty in many project activities. In order to improve the probability of meeting an intermediate schedule commitment and avoid the additional, unplanned work associated with the corrective action process, one may inherently gravitate toward "realistic" estimates with an 80-90% confidence level. The difference between a "realistic" estimate (80-90% confidence level) and a mean estimate (50% confidence level) may be defined as safety time. In addition to protecting one from unplanned work, this safety time may be the only mechanism employed to protect a project schedule and deliverables from uncertainty.

Including safety time in estimates may increase project duration by a factor of two or more. But leaving the safety time out of the estimates may mean that resource managers risk not meeting their commitments. The result may be constant conflict over the representation of the estimate in the project schedule. The results of this conflict may be unsatisfactory, and the effort may be non-value added activity that saps energy from the more important aspects of project planning.

Figure 2:
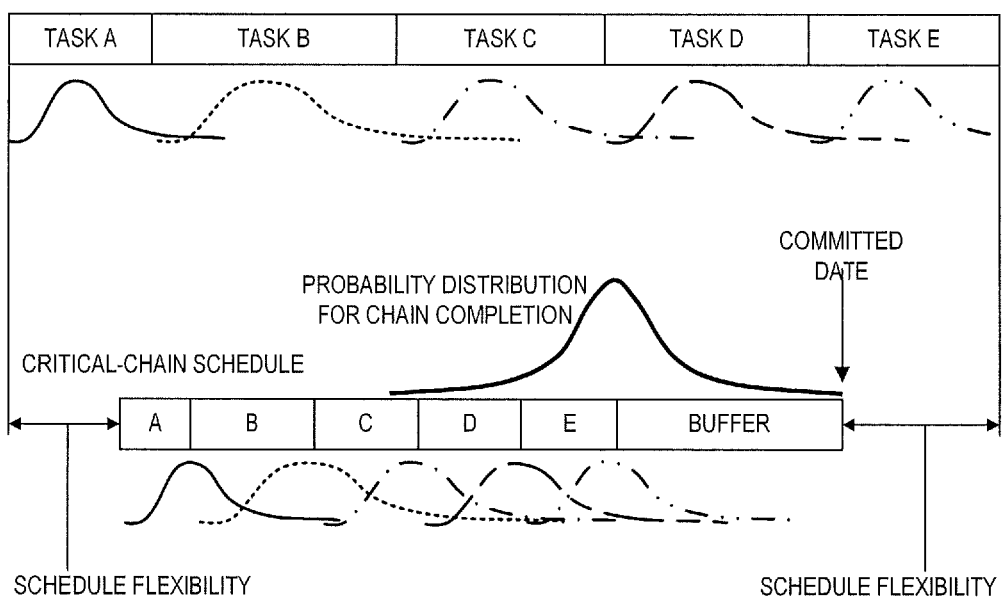
FIG. 2 illustrates scheduling according to critical chain project management.

CCPM was developed by Eliyahu M. Goldratt as a way to plan and complete projects faster with a higher probability of success. Referring to FIG. 2, in terms of the schedule, CCPM replaces the safety time typically embedded in individual task estimates with pools of aggregated safety time, referred to as buffers. These buffers may be placed at the end of each chain of dependent events in a project network to protect downstream events from the effects of uncertainty in the chain. The chains of dependency may include both task dependency and resource dependency. The schedule constraint may be the critical chain, which may be defined as the longest chain of dependencies, both resource and task, in the project network that gives the shortest possible schedule. A project buffer may be appended to the critical chain to protect the project commitments including the deliverables, schedule and budget. Notably, this buffer often must be backed up by money (management reserve) and the availability of resources (protective capacity); otherwise, buffer may only provide an indication of schedule risk.

In order for the critical-chain scheduling approach to succeed, the process owner must generally act to change the measures that govern performance of the process. Task due date compliance reporting must be replaced with status reports on active tasks based on the estimated time to complete the task at a 50% confidence level.

Although existing methods may produce adequate process models, their models may not be representative of the real system of dependencies. They may rely on assumptions about task precedence, assumptions about task durations, and assumptions about resources to develop schedules that reflect these assumptions. Many of these assumptions are erroneous.

Assumptions about task precedence are derivative of the order that is desirable to meet business case requirements of quality, cost and schedule. Usually, these precedence relationships are not supported by the analysis methods that produce a scalable feed-forward process that may be based on total order. As a result, plans produced via assumptions of task precedence are likely to require extensive modification in order to realize the desired result. These modifications to the plan manifest as expensive and time consuming rework that violates the necessary budget and schedule conditions for success. Problems that are large-scale and complex are particularly susceptible to this form of erroneous assumption.

The assumptions necessary to arrive at these estimates are seldom consistent with the conditions under which tasks are completed. Effects from a number of sources of uncertainty and variation, including the following, cannot be known at the time that task duration estimates are made:

Resource levels (capacity)
Skill levels of resources (capabilities)
Quality of inputs from predecessors
The effect of work-in-process inventories on lead-times for resources (conflicting priorities from other projects)
The conflict over estimates between resource managers and project managers
Unplanned rework caused by concurrent work on dependent tasks
Unplanned rework caused by compliance with schedule requirements when necessary inputs are missing In spite of these sources of variation and uncertainty, estimates of task duration (or milestone completion dates) and resource availability are applied to the questionable precedence relationships in defining the schedule constraints for the system of dependencies.

Larger, more complex systems such as development projects are made up of multiple, multi-project sub-systems. For these cases, the network of dependencies is far more detailed than the precedence relationships of functional tasks represented in the resulting plans, which may even further aggravate the aforementioned situation.

Even further, there may be additional conflict over the level of detail needed to create a process plan. In general, further breakdown in the detail of task definitions will result in more uncertainty, since the interrelationships become more complex. The sensitivity to variation of the interrelationships of these highly detailed task definitions would be subject to the unknown values of the resultant data. On the other hand, the less detailed tasks typically defined as functional responsibilities do not contain enough information to evaluate the key relationships that constrain the process represented by the precedence network. Therefore, resultant plans are a poor compromise that do not predict performance, and do not resolve the constraint relationships or the opportunities for large-scale parallelism. Instead, they substitute schedule constraints that mask the true nature of the required process.

Existing process-planning methods are not representative of the system of stochastic dependencies for large-scale, complex problems. They do not facilitate improved performance, nor do they predict the costly and time consuming rework that is caused by their use. Example implementations of the present disclosure therefore provide a system and method to establish constraints from a process (e.g., total-ordered process) into a planning environment using a construct that models the stochastic nature of tasks. In this regard, example implementations may provide a constraint basis for stochastic planning models using information from an appropriate process such as a total-ordered process. As explained below, these constraints may be termed "alpha-chain" constraints.

Example implementations will be primarily described in conjunction with scalable, hierarchical feed-forward processes, but it should be understood that example implementations may be equally applicable to any of a number of other types of processes. Also, example implementations will be primarily described in conjunction with aircraft production. But again, it should be understood that example implementations may be utilized in conjunction with a variety of other applications, both in the aircraft industry and outside of the aircraft industry.

Figure 3:
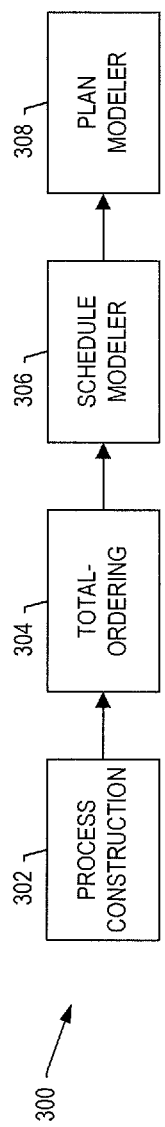
FIG. 3 illustrates a process-planning system in accordance with an example implementation.

Referring now to FIG. 3, a process-planning system 300 is illustrated according to example implementations of the present disclosure. The system may include any of a number of different subsystems (each an individual system) for performing one or more functions or operations. As shown, for example, the system may include a process-construction system 302, total-ordering system 304, schedule modeler 306 and/or plan modeler 308. The process-construction system may be generally configured to construct a process for production of a product. The total-ordering system may be generally configured to establish total-ordering in a process such as that constructed by the process-construction system (well-ordering at times being used interchangeably, but more specifically referring to total-ordered set in which every non-empty subset has a minimum element). The schedule modeler may be generally configured to construct a process schedule according to a total-ordered process such as that from the total-ordering system. The plan modeler, then, may be configured to construct a plan model based on the process and its schedule. Although shown as part of the process-planning system, one or more of the process-construction system, total-ordering system, schedule modeler and/or plan modeler may instead be separate from but in communication with the process-planning system. It should also be understood that one or more of the subsystems may function or operate as a separate system without regard to others of the subsystems. And further, it should be understood that the process-planning system may include one or more additional or alternative subsystems than those shown in FIG. 3.

As indicated above, the process-construction system 302 may be configured to construct a process for production of a product. A product, including physical products (e.g., objects) and non-physical products (e.g., information), may be described in terms of a hierarchical breakdown (hereinafter referred to as a "hierarchy") of the product's components. A "process" may be adapted to describe production of the product by defining tasks and precedences associated with the creation of each component. For example, the precedences may indicate that a particular task should be completed before another task is performed. In various examples, a task may refer to an activity or set of activities performed during creation of a component.

A complex process may include one or more sub-processes each of which may at times be considered a separate process without regard to the complex process or others of the sub-processes. In one example, the process constructed by the process-construction system 302 may be expressible as a network. The process-construction system may construct a suitable network in any of a number of different manners. In one example, the process-construction system may construct the network in accordance with technologies described in U.S. Pat. No. 7,899,768, entitled: Methods and Systems for Constructing a Scalable Hierarchical Feed-Forward Model for Fabricating a Product, issued Mar. 1, 2011, the content of which is hereby incorporated by reference in its entirety. In one example, the process, and thus its network expression, may be adapted to maintain a feed-forward constraint such that no cycles or loops are contained within the process. The process and its network expression may also be scalable such that it may be combined with other processes to generate a larger process.

As used herein, a "product" may refer to something input into or produced by a process in the network. An illustrative process may be a commercial aircraft development process. In one example, a product of the commercial aircraft development process may include an aircraft or a part of the aircraft (e.g., fuselage section, wing, landing gear, engine, etc.). In another example, the product may include a type certificate or other relevant document related to legal use of the aircraft. In yet another example, the product may include a design specification or other dataset related to the design and/or construction of the aircraft. Some other examples of products may include a wing center section, a control column and wheel, an overhead stowage bin, a layout of passenger arrangement, front spar interface loads, pitching moment curves and the like.

The product may be either an "internal product" or an "external product." An internal product may be producible by one or more tasks in the network (the respective one or more tasks in various instances being considered a sub-process). In one example, an internal product may be considered a segment, which may be an internal product that is not a component of another internal product, but is instead intended to be broken into more detailed components. An internal product may receive as input an external product and/or an internal product. Some examples of internal products in the commercial aircraft development process may include avionics, propulsion systems, engine-specific fuel consumption curves and the like. Each internal product may include one or more "internal inputs," which may be utilized or needed to produce the internal product.

The internal inputs may include "internal components" and "component inputs." The internal components may refer to a subset of non-external inputs that is not part of the same segment as the internal product. The component inputs may refer to a subset of non-external inputs that is part of the same segment as the internal product. Each component input may include multiple "component products," the aggregate of which form the component input. An illustrative internal product may be a subassembly. For the subassembly, an example component input may be parts of the subassembly, and an example internal component may be a tool that assembles the parts to produce the subassembly. In this case, the parts assemble to form the subassembly. As such, the parts are considered in the same segment as the subassembly. In contrast, the tool that assembles the parts is not included within the subassembly. As such, the tool is considered as not part of the same segment as the subassembly.

The external product may be produced outside of a process in the network. In contrast to the internal product, input to the external product may not be represented in the context of the process or its network expression. Some examples of external products in the commercial aircraft development process may include regulatory requirements, customer requirements, company ground rules, existing facilities and the like. The external product may include multiple components, the aggregate of which forms the external product. Each such component forming the external product may be referred to herein as an "external component." The internal products, external products, internal components, component inputs and/or external components may form the set of inputs into a process adapted to produce any given internal product.

Each internal product may be a component. Each component may include multiple nested components, and may further include additional nested components at deeper levels of the hierarchy. In the commercial aircraft development process, some examples of segment components may include technology assessment, exploratory design, conceptual design, preliminary design, production system, infrastructure, detail manufacturing plans, vehicle product, product validation and the like. The example component "infrastructure" may include a nested component "production facilities," which further includes a nested component "major assemblies." The component "major assemblies" may include a nested component "wing center section," which further includes a nested component "upper panel." Additional nested components may continue from the component "upper panel."

As used herein, an "input" may refer to a product, such as an internal or external product, that may be utilized or required by the task to produce another product. That is, a statement that a first product is input to a second product may refer to the utilization or requirement of the first product by the task to produce the second product. For example, an internal product may be a design specification of an airplane wing. An external product may be specifications of fasteners that are utilized or required in the production of the detailed design. In this case, since the design specification of the airplane wing utilizes or requires the specifications of fasteners, the specifications of fasteners may also be referred to as an external input to the design specification of the airplane wing. According to some example implementations, an internal product can receive an input, but an external product cannot receive an input. Example technologies for selecting the inputs are described in the above-referenced and incorporated '768 patent.

The process constructed by the process-construction system 302 may be expressed by a feed-forward network including one or more external products and two or more segments. In one example, as described in greater detail in the '768 patent, the process construction may include selection of one or more segments as final products of the process. At the segment level, the feed-forward network may be initialized by selection of other segments required for the production of a final segment as its input. Then, any input which does not violate the order of the feed-forward network may be specified, further augmenting the feed-forward network. If a segment requires only external products as inputs to produce its product, it may be an initial product. Establishment of a feed-forward network that connects initial products to final products and contains all segments of the network may be necessary to complete this, segment-level phase of the process construction. In various examples, new external products and segments that establish proper connection to the feed-forward network may be added. This may imply that all segments have at least one specified internal or external input.

As indicated above, segments may be internal products of the process intended to be broken into more detailed components. Similarly, external products may be broken into more detailed external products. Internal and external products may form a hierarchy rooted at the process. When creating a new, lower-level of the feed-forward network, this hierarchy may be uniformly expanded by adding components and external products that are connected into the network at this new level. Two or more components may be defined for each segment to create the next level of the network. Similarly, each of the external products required for the process may have at least two detailed external products composing it, which may be defined.

The selection of inputs to components may be more restrictive than the selection of inputs into segments. A sub-network, which is also feed-forward and connects only components of a single segment, may be established for each segment such as by specifying the component inputs of each component. Further, components of the inputs of the containing segment may be the only possible internal inputs to a component. The external inputs to a component may be similarly constrained. The addition of internal and external inputs to a component may integrate that component and the component sub-network into the feed-forward network at the component's level. At least one of a segment's components may input at least one of the components of each of that segment's internal inputs, and similarly, for specifying external inputs for the component from the segment's external inputs.

The process hierarchy may be further broken down by adding levels of components and external products. The component inputs of each containing component may constrain the internal inputs of the contained component in the same way the internal inputs of a segment constrain the internal inputs of its components. Otherwise, levels of components and their resulting sub-networks may be specified in the same way as the first level of components of segments.

Two processes with the same level of hierarchical breakdown constructed as above may be combined if products of one of the processes can be mapped to the external inputs of the other. Similarly, two feed-forward networks at the segment level are such that the external input requirements of one do not precede the external input requirements into the other, the networks may be combined into a single process.

Figure 4:
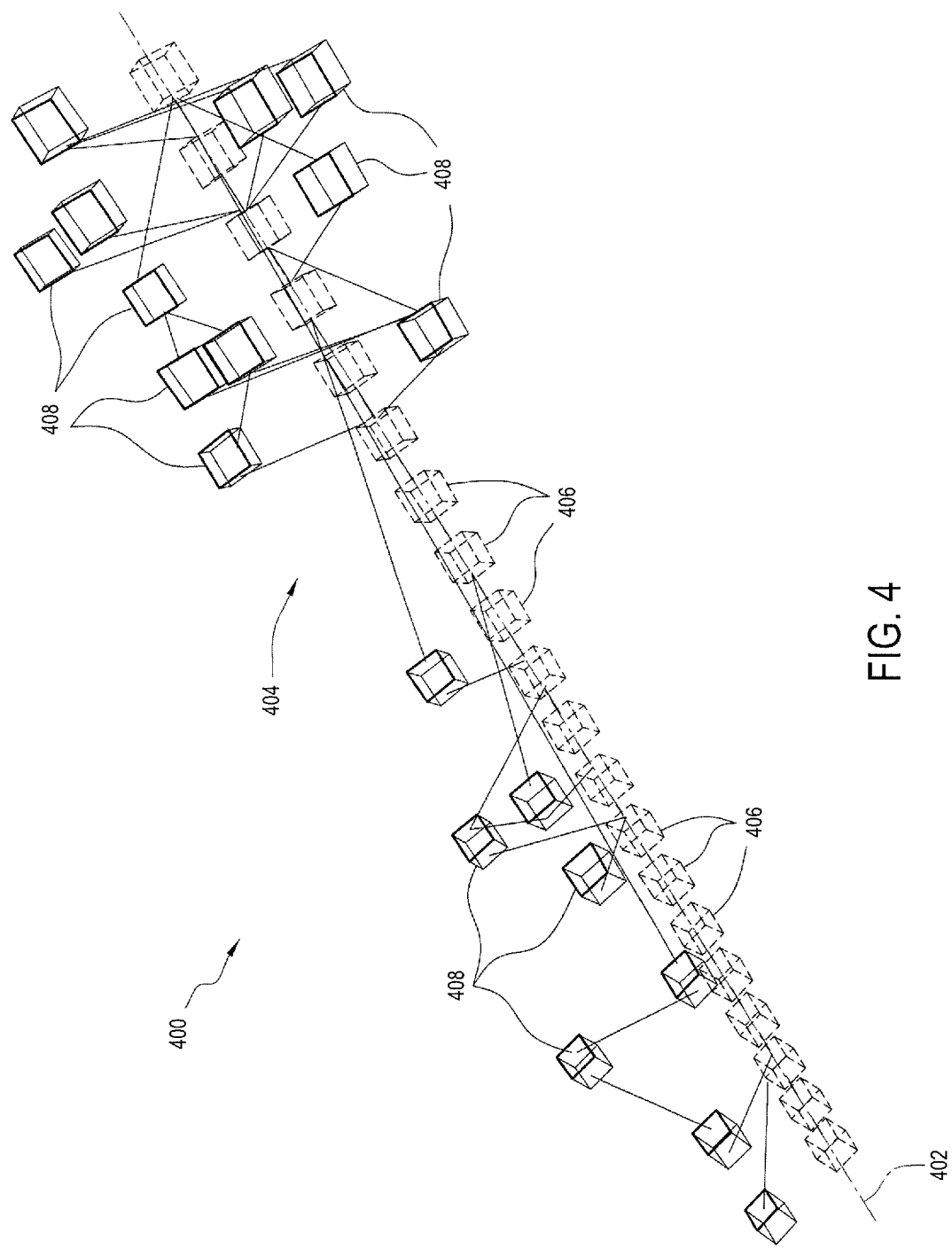
FIGS. 4 and 5 illustrate feed-forward networks in accordance with example implementations.

FIG. 4 illustrates an example layout of a suitable network diagram 400 that may express a process constructed by the process-construction system 302 of one example implementation. Standard network characteristics may be used in the layout to add meaning to displayed data. As shown, for example, the network includes a central time-directed axis 402, and a plurality of network nodes 404 that express respective products of the process. The nodes may be connected by edges reflecting precedence relationships between the nodes, and correspondingly between the respective products of the process. Each of the network nodes may include an associated slack parameter that may be used to determine a distance of the network node from central time-directed axis. In this regard, nodes 406 having zero slack values may be selected to lie on or near the axis, and other nodes 408 having higher slack values may be positioned about the axis. In one example, nodes 406 may be strictly-ordered nodes without flexibility in their order (linearly constrained), and the axis may be a linear, strictly-ordered axis. In this example, the other nodes 406 may be parallel nodes that have some flexibility in their order. As explained in greater detail below, nodes 406 may form a first or alpha chain, and other nodes 408 may form one or more second or second alpha chains.

Figure 5:
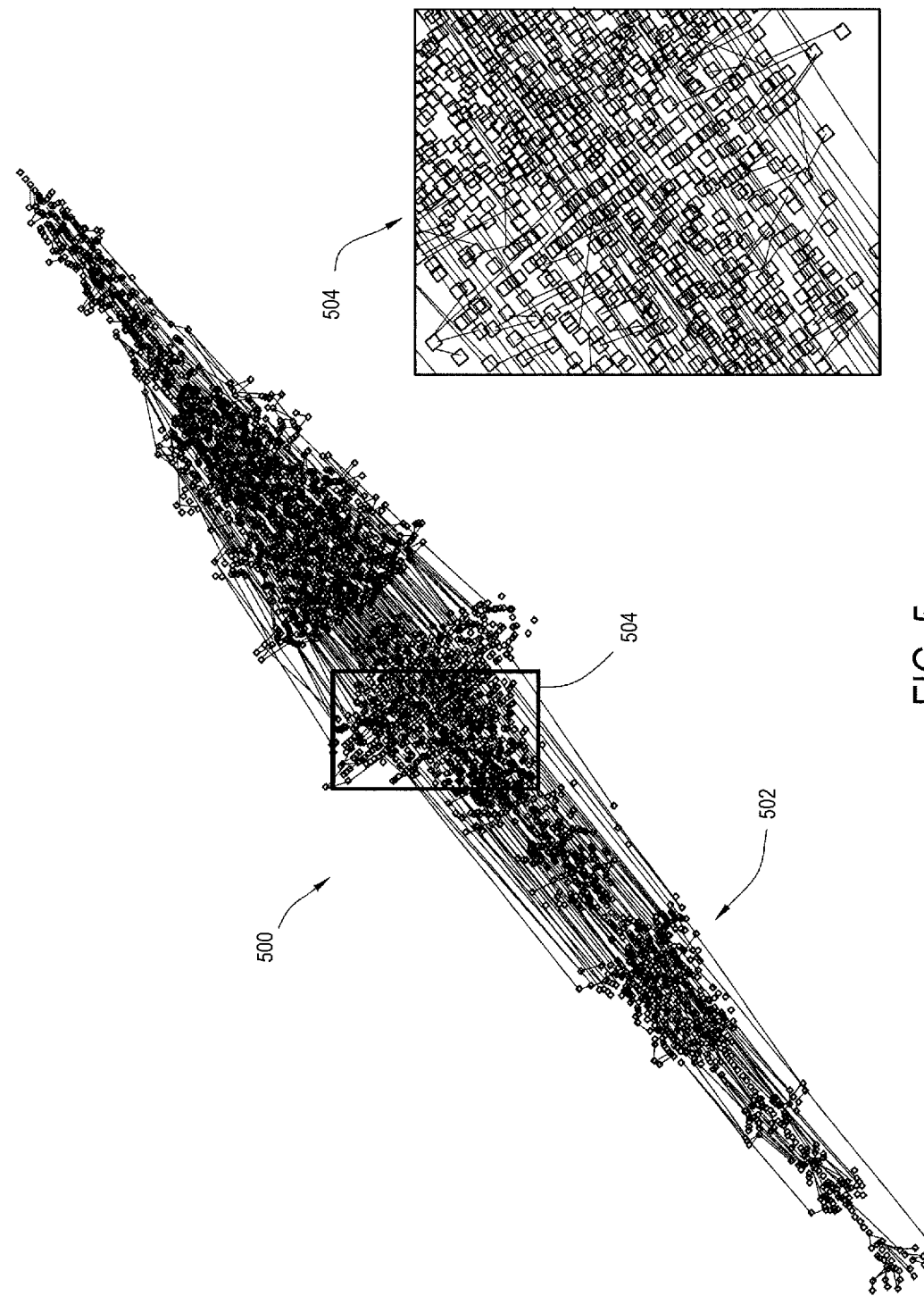

FIG. 5 illustrates a suitable network diagram 500 similar to diagram 400, but that may express a more complex process. As shown, similar to the diagram of FIG. 4, the network diagram of FIG. 5 a plurality of network nodes 502 that may be connected by edges reflecting precedence relationships between the nodes, a portion of which are further highlighted in inset 504. For more information regarding the layouts of FIGS. 4 and 5, as well as other suitable layouts according to example implementations, see U.S. Pat. No. 7,873,920, entitled: Methods and Systems for Displaying Network Information, issued Jan. 18, 2011, the content of which is hereby incorporated by reference in its entirety. For other example layouts of suitable network diagrams, see U.S. Patent Application Publication No. 2012/0050287, entitled: Three-Dimensional Display of Specifications in a Scalable Feed-Forward Network, published Mar. 1, 2012, the content of which is hereby incorporated by reference in its entirety.

In a network diagram such as the network diagrams 400, 500 of FIGS. 4 and 5, the nodes 404, 502 may represent the tasks to produce the internal products. The edges connecting nodes, then, may represent the internal products and reflect the precedence relationships between tasks. For example, an internal product that is utilized or required for production of another internal product may be represented by an edge connecting nodes representing the tasks to produce the respective internal product and other internal product. In this example, the task to produce the internal product may be considered a predecessor, and the task to produce the other internal product may be considered a successor. In this manner, the tasks (nodes) to produce internal products of the process expressed by the network may be properly ordered according to the internal products (edges) connecting them.

In one example, the total-ordering of internal products may enable efficient execution of the process. In this regard, ordering constraints such as total ordering may enable differentiation of the degree of impact that individual internal products may have on the process execution performance and resources. Adherence to integration constraints may enable efficient execution of the process. FIG. 6 illustrates a total-ordering system 600 that in one example may correspond to the total-ordering system 304 of FIG. 3. As shown, the total-ordering system 600 may be generally configured to establish total-ordering in a process such as that constructed by the process-construction system. As shown, the total-ordering system may include a segment-level total-ordering module 602, one or more lower-level total-ordering modules 604 and a lowest-level total-ordering module 606. In various examples, the total-ordering system may only include the segment-level total-ordering module, or may only include the segment-level total-ordering module and lower level total-ordering module. Or for greater detail, the total-ordering system may include the segment-level total-ordering module, one or more lower level total-ordering modules and the lowest-level total-ordering module.

As explained in greater detail below, the segment-level total-ordering module 602 may be configured to establish total-ordering at the segment level in a hierarchical feed-forward process, such as that constructed by the process-construction system 302. The segment-level total-ordering module may also be configured to rebalance the level of detail during establishment of a network model structure to achieve consistency in content. The lower-level total-ordering module 604 may be configured to determine if total-ordering has been satisfied through decomposition of a process into one or more lower-levels, and may also rebalance the level of detail during decomposition. Similarly, the lowest-level total-ordering module 606 may be configured to confirm total-order of the process through its lowest level. In various examples, the lowest-level total-ordering module may also be configured to adjust content of the lowest-level components to satisfy total-order. In various examples, the total-ordering system 600 may produce a total-ordered process that may be expressed as a scalable, hierarchical feed-forward network with consistency in the detail content present in each hierarchical level.

Reference will now be made to FIG. 7, which illustrates a more particular example of a suitable total-ordering system 700 including segment-level, lower-level and lowest level total-ordering modules 702, 704, 706. In one example, the system and its modules may correspond to the total-ordering system 600 and respective ones of the segment-level, lower-level and lowest level total-ordering modules 602, 604, 606 of FIG. 6.

As shown, the segment-level total-ordering module 702 may include a segment partitioner 708, component partitioner 710 and consistency checker 712 coupled to one another. The segment partitioner may be configured to receive process-related information that generally may describe a particular hierarchical process at the segment-level, such as may be expressed by a suitable network. That is, the segment partitioner may be configured to receive process-related information for a process including two or more segments having precedence relationships, each of at least some of the segments including two or more segment components at least some of which have precedence relationships across segments.

The process-related information may describe the internal products, external products, internal components, component inputs and/or external components of the process at the segment-level. The process-related information may describe the tasks to produce the internal product, and precedence relationships between tasks (predecessors, successors). In one example, the process-related information may be received from a process-construction system such as process-construction system 302. The process-related information may describe segments of the process, which the segment partitioner 708 may be configured to partition by disjoint collections based upon earliest availability.

The segment-level total-ordering module 702 may be configured to determine an instance in which the segment components are total-ordered. In one example, relative to the network expression of the particular process, the segment partitioner 708 may be configured to partition the segments into sets of concurrent nodes (each node a respective segment). The segment partitioner may determine a first set of concurrent nodes by selecting all nodes that are not successors of any edge in the network. The second set of concurrent nodes includes those nodes that are successors only of edges whose predecessors are contained in first set of nodes. Subsequent sets may be formed by selecting nodes that are successors only for edges for which the predecessors are contained in the previous concurrent sets of nodes. This may be repeated until the network is partitioned into sets of concurrent nodes. The sets of concurrent nodes may be maintained in the sequential order of construction.

For each set of concurrent nodes, the segment partitioner 708 may simulate the application of forces. The segment partitioner may thereby determine a spatial arrangement of its nodes, and determine those edges for each node where that node is a predecessor and the successor node of the edge is in the nearest following set of concurrent nodes where the resulting set of edges is not empty. The result may be a set of earliest following nodes (which may be empty) for each node in the network. As described herein, a set of concurrent nodes may at times be referred to as a partition.

After partitioning the segments, the segment partitioner 708 may determine the number of segments in each partition, and whether each partition contains only one segment or more than one segment. In an instance in which each partition contains only one segment, the segments of the process may be considered total-ordered. On the other hand, in an instance in which a partition contains more than one segment, the segment partitioner may assimilate or otherwise merge the segments in the same partition into a single segment. In one example, the partitioner may merge segments with membership in more than one partition into a segment that has membership in the same, earliest possible partition. The partitioner may then repartition the segments of the process (now including the merged segments in the same partition). The segment partitioner may then again determine the number of segments in each partition, and whether each partition contains only one segment or more than one segment. This may repeat until each partition contains only one segment, with the segments of the process thereby being total-ordered. The segment partitioner may thereby be configured to determine an instance in which the segments of the process are total-ordered.

The component partitioner 710 of the segment-level total-ordering module 702 may be configured to receive further process-related information that generally may describe components of the total-ordered segments. This may represent a decomposition of the ordered segments into their respective components. Similar to before, in one example, the further process-related information may be received from a process-construction system such as process-construction system 302. The component partitioner may be configured to partition the components of the total-ordered segments by disjoint collections based upon earliest availability to produce earliest-available partitions, and separately based upon latest availability to produce latest-available partitions. For the partitioning based on earliest availability, for example, the component partitioner may partition the components in a manner similar to that described above. The partitioning based on latest availability may likewise occur similar to above, but determine those edges for each node where that node is a predecessor and the successor node of the edge is in the farthest following set of concurrent nodes where the resulting set of edges is not empty. This may result in a set of latest following nodes (which may be empty) for each node in the network. To distinguish from the former, segment partitions, these partitions may be referred to as segment-component partitions.

The component partitioner 710 may identify order flexibility for each segment component based upon membership in both earliest-available and latest-available partitions. In an instance in which a segment component has membership in identical earliest-available and latest-available partitions, the product segment may have no order flexibility (i.e., it may be order inflexible). On the other hand, in an instance in which a segment component has membership in different earliest-available and latest-available partitions, the product segment may have order flexibility. The component partitioner may then determine if each partition in both the earliest-available and latest-available partitions contains only one order-inflexible segment component. In this instance, the partitions may be ordered, and the upper and lower boundaries of each partition's component membership may be determined. The segment components of the process may thereby be considered total-ordered.

In some instances, each partition in both the earliest-available and latest-available partitions may contain more than one order-inflexible segment component. The consistency checker 712 of the segment-level total-ordering module 702 may in these instances perform a consistency check of a level of content detail of segment components across a number of bordering partitions. In various examples, consistency problems may be probable in instances in which a segment's number of aggregate components is significantly different in number than that of other segments. Consistency problems may also exist in instances in which significant differences in content detail of segment components occur across bordering partitions. An example of this may be the identification of relationships across partition boundaries of segment components that are system level (e.g., aircraft or factory), with segment components that are subcomponent level (e.g., air conditioning duct bracket or ground cart hydraulic fitting).

In instances in which the consistency check fails, the consistency checker 712 may assimilate or otherwise merge segment components with overly-specific content detail into other segment components of the same segment. This merger may bring the definition content of the assimilated components to a more appropriate generalization. In instances in which segment components do not contain sufficient definition of content (insufficiently specific to relate appropriately with components in bordering partitions), the consistency checker may revise segment components of the same segment to add more specific characterization to the content detail of the respective segment components.

After either or both of the aforementioned merger or revision, the consistency checker 712 may communicate back with the component partitioner 710, which may repartition the segment components (now including the merged and/or revised segment components). The component partitioner may then again partition the segment components, identify order flexibility for each segment component and determine if each partition in both the earliest-available and latest-available partitions contains only one order-inflexible segment component.

The foregoing operations of the component partitioner 710 and consistency checker 712 may repeat until each partition in both the earliest-available and latest-available partitions contains only one order-inflexible segment component, or the consistency check is satisfied. Again, in the instance that each partition in both the earliest-available and latest-available partitions contains only one order-inflexible segment component, the partitions may be ordered, and the upper and lower boundaries of each partition's component membership may be determined, with the segment components of the process thereby being total-ordered.

The lower-level total-ordering module 704 may include a total-order checker 714, lower-level component partitioner 716 and second consistency checker 718 coupled to one another. In one example, the total-order checker may be configured to determine an instance in which the segment components of the process are total-ordered, with the partitions being ordered, and the upper and lower boundaries of each partition's component membership being determined. The total-order checker may also determine whether the network exposes a sufficient level of detail to properly characterize the process. In instances in which no further detail is required, the process may be considered total-ordered. Otherwise, in instances in which further detail may be desired or otherwise required, the total-order checker may communicate with the lower-level component partitioner to continue decomposition of the network. In one example, the consistency checker 712 may similarly communicate with the lower-level component partitioner in instances in which each segment partition in both the earliest-available and latest-available partitions contains more than one order-inflexible segment component, but the consistency check is satisfied.

The lower-level total ordering module 704 may be configured to determine an instance in which the lower-level components are total-ordered. In one example, the lower-level component partitioner 716 may be configured to receive even further process-related information that generally may describe lower-level components of the segment components. In this regard, in the process, each of at least some of the segment components include two or more lower-level components at least some of which have precedence relationships across segment components. In various examples, the process may include lower-level components at one or more lower levels of the hierarchy including a lowest level. The lower-level components at the lowest level may be lowest-level components at least some of which have precedence relationships across parent components at a parent level of the hierarchy. Again, this may represent a decomposition of the segment components into their respective lower-level components. Again, the process-related information may be received from a process-construction system such as process-construction system 302.

The lower-level component partitioner 716 may be configured to process the lower-level components in a manner similar to the component partitioner 710 being configured to process segment components. In this regard, the lower-level component partitioner may partition the lower-level components of the segment components by disjoint collections based upon earliest availability to produce lower-level earliest-available partitions, and separately based upon latest availability to produce lower-level latest-available partitions. The lower-level component partitioner may also identify order flexibility for each lower-level component through membership in respective lower-level earliest-available and latest-available partitions. In one example, the partitioning and identification of order flexibility may occur in a manner similar to that described above for the component partitioner 710. Similar to before, in an instance in which a lower-level component has membership in identical lower-level earliest-available and latest-available partitions, the segment component may have no order flexibility (i.e., it may be order inflexible). On the other hand, in an instance in which a lower-level component has membership in different lower-level earliest-available and latest-available partitions, the segment component may have order flexibility.

The lower-level component partitioner 716 may determine if each partition in both the lower-level earliest-available and latest-available partitions contains only one order-inflexible, lower-level component. In this instance, the partitions may be ordered, and the upper and lower boundaries of each partition's lower-level component membership may be determined. The lower-level components of the process may thereby be considered total-ordered. The lower-level component partitioner may then communicate back with the total-order checker 714 to determine whether the network now exposes a sufficient level of detail to properly characterize the process. If not, the lower-level component partitioner may receive an even further decomposition of the network and repeat its operations.

In some instances, each partition of a component in both the lower-level earliest-available and latest-available partitions may contain more than one order-inflexible lower-level component. The lower-level component partitioner 716 may in these instances determine if the parent level (e.g., segment level) of the network is total-ordered. If not, the second consistency checker 718 may perform a consistency check of a level of content detail of lower-level components across a number of bordering partitions, such as in a manner similar to that described above for the consistency checker 712. Similar to before, in instances in which the consistency check fails, the second consistency checker may merge and/or revise lower-level components, such as in a manner similar to that described above.

After either or both of the merger or revision, or in instances in which the consistency check is satisfied, the second consistency checker 718 may communicate back with the lower-level component partitioner 716, which may repartition the lower-level components (now including the merged and/or revised lower-level components). The lower-level component partitioner may then again partition the lower-level components, identify order flexibility for each lower-level component and determine if each partition in both the lower-level earliest-available and latest-available partitions contains only one order-inflexible lower-level component. The lower-level component partitioner and second consistency checker may repeat their operations until the parent level of a given lower-level of the network is total-ordered.

As suggested above, the lowest-level total-ordering module 706 may be configured to determine if total-ordering has been satisfied through the lowest level of decomposition of a process. The lowest-level total-ordering module 706 may include an assessor 720, restructurer 722 and lowest-level component partitioner 724 coupled to one another.

Situations may exist that as large-scale, complex processes continue to decompose to a desired or required level of detail after achieving total-ordering in higher-levels of the process, the determination of total-ordering of the process may benefit from a modification. In some instances, for example, the lowest-level of the network may not be total-ordered, but its parent level may be total-ordered. In these instances, the assessor 720 may determine whether the network exposes a sufficient level of detail to properly characterize the process.

In instances in which no further detail (decomposition) is required, the assessor 720 may identify the disjoint partitions containing multiple lowest-level, order-inflexible components, and define input/output threads of the lowest-level, order-inflexible components across a number of preceding and/or succeeding partition boundaries. The assessor may then determine if the condition exists that only one of the lowest-level, order-inflexible components in its partition has only corresponding lowest-level, order-inflexible components in its input/output thread. If yes, the partitions may be ordered, and the upper and lower boundaries of each partition's lowest-level component membership may be determined, with the lowest-level components of the process thereby being total-ordered. Again, in some instances, the parent component of the lowest-level may be order-inflexible, but when decomposed for additional detail, its children may decompose into multiple order-inflexible components. Looking across partitions of the input/output threads of these multiple order-inflexible components may resolve the identification of choosing the appropriate child component to satisfy total order. This may not be a normal condition of a natural morphological decomposition, but may manifest in the manner that design specifications fragment at the lowest level of the process, and may therefore be handled by involving groups of partitions instead of looking at partitions individually.

If the condition does not exist that only one of the lowest-level, order-inflexible components in its partition has only corresponding lowest-level, order-inflexible components in its input/output thread, the restructurer 722 may be configured to restructure at least some of the lowest-level components of the process. In one example, the restructurer 722 may merge and/or revise lower-level components, such as in a manner similar to that described above for the consistency checker 712. That is, the restructurer may assimilate lowest-level components that are too specific in definition detail into lowest-level components in the same segment lower-level component aggregation to rebalance the level of detail across partitions. Additionally or alternatively, the restructurer may revise the lowest-level components in the segment lower-level component aggregation that have insufficient characterization of details, which may expose required detail in the lowest level components to rebalance the process or rather its network expression. The restructurer may then perform one or more adjustments to rebalance the network, such as in accordance with construction methods performed by a process-construction system such as process-construction system 302.

After the restructurer 722 rebalances the network, the lowest-level component partitioner 724 may process the lowest-level components in a manner similar to the component partitioner 710 processing segment components, and/or the lower-level component partitioner 716 processing the lower-level components. The lowest-level component partitioner may partition the lowest-level components by disjoint collections based upon earliest availability to produce lowest-level earliest-available partitions, and separately based upon latest availability to produce lowest-level latest-available partitions. The lowest-level component partitioner may also identify order flexibility for each lowest-level component through membership in respective lowest-level earliest-available and latest-available partitions.

The lowest-level component partitioner 724 may determine if each partition in both the lowest-level earliest-available and latest-available partitions contains only one order-inflexible, lowest-level component. In this instance, the partitions may be ordered, and the upper and lower boundaries of each partition's lowest-level component membership may be determined. The lowest-level components of the process may thereby be considered total-ordered. In some instances the network may exposes a sufficient level of detail to properly characterize the process. In other instances, however, the network may not expose sufficient detail. In these other instances, the lowest-level component partitioner may further determine if the parent level of the network is total-ordered, and if so, the needed detail may be localized in nature and achieved by the restructurer 722 revising lower-level components of the same component, similar to before. The restructurer may also again perform one or more adjustments to rebalance the network. The lowest-level component partitioner may then again process the lowest-level components in a manner similar to before. This may repeat until the lowest-level components of the process are total-ordered.

Figure 8:
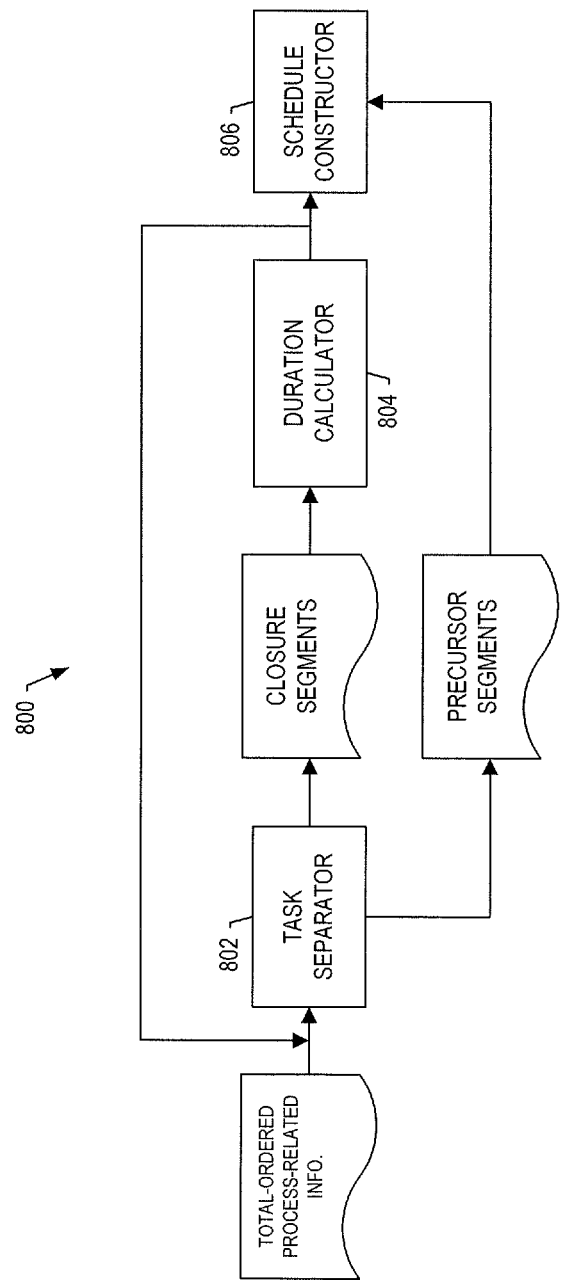
FIG. 8 illustrates one example of a schedule modeler in accordance with an example implementation.

Briefly now returning to FIG. 3, the network that expresses a process such as that constructed by the process-construction system 302, and/or total-ordered by the total-ordering system 304 may describe a logical sequence of tasks to produce internal products of the process. The schedule modeler 306 of the process-planning system 300, then, may be generally configured to construct a process schedule for execution of at least some of the tasks of the process. FIG. 8 illustrates a schedule modeler 800 that in one example may correspond to the schedule modeler 306 of FIG. 3. As shown, the schedule modeler 800 may be generally configured to receive process-related information for a total-ordered process, such as from the total-ordering system.

The process-related information received by the schedule modeler 800 generally may describe a particular process, such as may be expressed by a suitable total-ordered network. As suggested above, the process-related information may describe the internal products, external products, internal components, component inputs and/or external components of the process. The process-related information may describe the tasks to produce the internal product, and precedence relationships between tasks (predecessors, successors). Even further, the process-related information may include task durations for the respective tasks to produce internal products of the process. The task duration may be represented in any of a number of different manners, such as by a single estimated value, some combination of multiple estimated values or a statistical quantity. In one example, task duration may be represented by a probability distribution such as that shown in FIG. 1.

The tasks to produce internal products of the process may be arranged in one or more paths or chains of logically-sequenced tasks each of which may be scheduled during production of the process schedule (generally referred to herein as a "chain"). As suggested above with respect to FIGS. 4 and 5, the chain including strictly-ordered tasks may be considered the first or alpha chain, and any other chains may be considered second or second alpha chains. In one example, each chain may further include a buffer of a duration that may account for uncertainty in the task durations of the chain's tasks. For the alpha chain, the buffer may at times be referred to as the first, project or alpha buffer, and for each second alpha chain, the buffer may a times be referred to as the second or second alpha buffer.

The process of example implementations may be considered data driven in that execution of its tasks may depend on the existence or availability of their respective inputs. As indicated above, the task to produce an internal product may utilize or require one or more inputs, such as one or more internal products and/or external products. These inputs may be available at the same or different times, and temporally may include at least a last input. Some tasks require all of their inputs including the last input before they may be initiated, and must therefore be performed serially. Other tasks, however, may include one segment that requires availability of the last input before it may be initiated, but also include another segment that may be initiated before the last input is available. For these other tasks, the segment that requires availability of the last input must be performed serially, while the segment that does not require availability of the last input may be performed concurrently. For the avoidance of confusion with the aforementioned segments that may be internal products of a process, the segments of a task may at times be referred to as "portions" of the task.

A commercial aircraft development process may include, for example, the task to produce the detail part layout for a major assembly. The task may depend on the availability of inputs including, in the order in which they may be temporally available: internal-loads data, build-plan information, supplier information, tooling information, a major-assembly-integration layout, and interface loads and sizing data. In this example, the task may include a portion that requires availability of the last input (interface loads and sizing data) before it may be initiated, but also include another portion that may be initiated before the last input is available.

Figure 9:
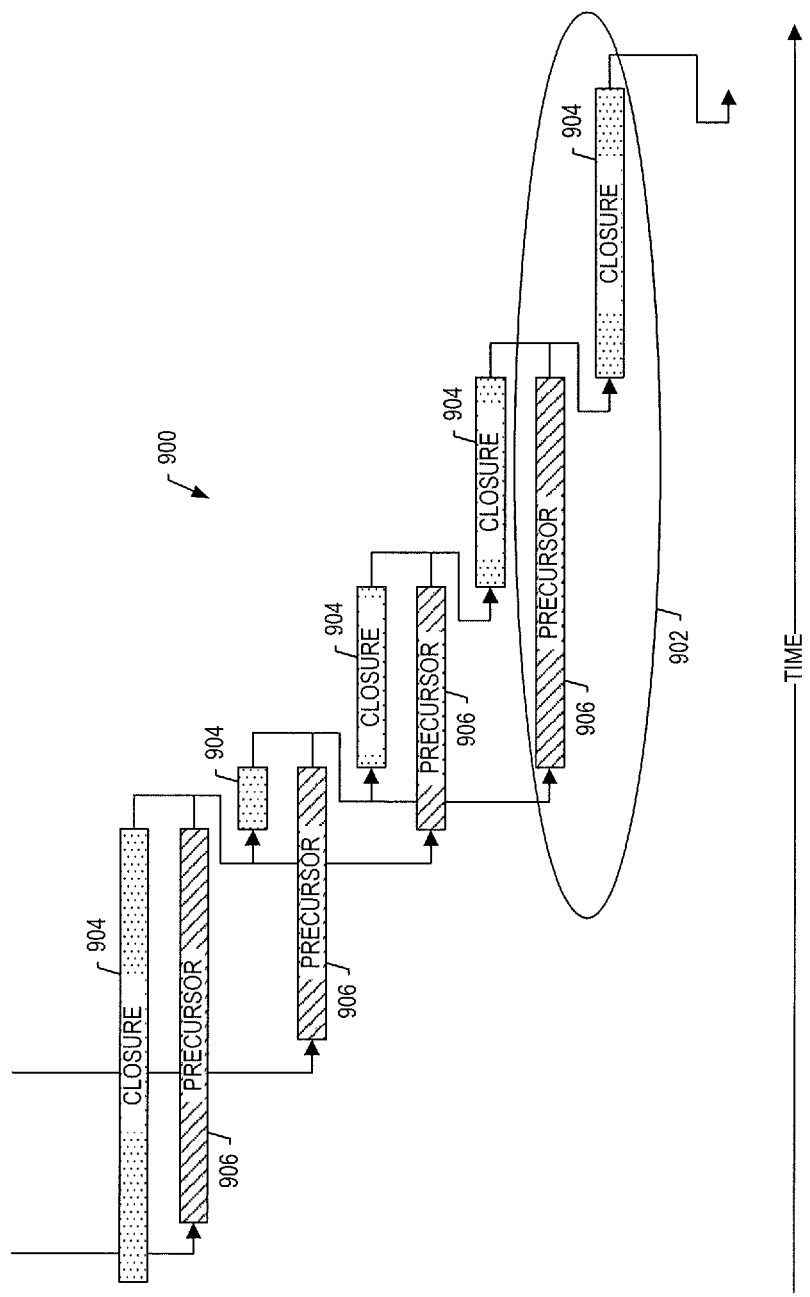
FIG. 9 illustrates a portion of a chain of tasks and input dependencies between its closure portions and precursor portions, according to one example implementation.

A "closure" portion may be a portion of a task that requires the availability of the last input of its task before being initiated, and must therefore be performed serially. A "precursor" portion on the other hand, may be a portion of a task capable of being initiated before the last input of its task is available, and may therefore be performed concurrently. A closure portion may therefore be initiated only when all of the task's inputs are available. A precursor portion may be initiated before all of the task's inputs are available. In one example, a precursor portion may be initiated when a first effective one of its inputs is available, which temporally may or may not be the first input, but is other than the last input to the task. In various examples, a closure portion or precursor portion may receive as inputs internal products produced by closure portions and/or precursor portions. Similarly, a closure portion or precursor portion may produce an internal product that may be input to closure portions and/or precursor portions. FIG. 9 illustrates a portion 900 of a chain of tasks 902 and input dependencies between its closure portions 904 and precursor portions 906, according to one example implementation.

Generally, precursor portions may contain more uncertainty than closure portions. Accordingly, closure portions may be more representative of dependencies that govern progress of the process. In various example implementations, then, the schedule modeler 800 may schedule tasks based on their input dependencies, and may not require discrete dates or discrete task durations. As shown in FIG. 8, the schedule modeler may include a task separator 802 configured to separate each of one or more tasks to produce internal products of the process into distinct closure portions and precursor portions (some tasks may not include a distinct precursor portion). In one example, the task separator may separate the tasks on a chain basis, beginning for example, with the alpha chain. The task separator may then communicate the closure portions to a duration calculator 804.

The duration calculator 804 may be configured to receive or calculate an average duration for the closure portions of the chain, and in one example, may calculate a buffer size (duration) for the respective chain. In one example, the duration calculator may calculate the average duration and buffer based on a time-frame constraint such as a predetermined end date (e.g., milestone) for execution of the process within a target time frame (L'). Similar to task durations, closure-portion durations may be expressed as statistical quantities with known or even unknown probability distributions, such as modeled in FIG. 1. In one example, then, the duration calculator may express the average closure-portion duration (A) and buffer size (B) as a function of time-frame (L), and number of closure portions (n) in the chain. In one example the time-frame (L) may be represented as follows:

$$L=nA+B \quad (1)$$

In various examples, the buffer size (B) may be derived as a statistical variance using the square root of the sum of the squares of the differences between safe duration (S) and average duration (A), which durations in one example may be related by an assumption. These relationships may yield a polynomial equation that may be used to calculate the average task duration for the closure portions, which in one example may be rounded to an integer value (e.g., in units of days).

In one example in which S=2A, the buffer size (B) may be calculated according to a root mean square function, such as the following:

$$B=\sqrt{n(S-A)^2}=\sqrt{n(2A-A)^2}=\sqrt{nA^2} \quad (2)$$

Equations (1) and (2) may be combined to yield the following quadratic expression:

$$(n^2-n)A^2-2LnA+L^2=0 \quad (3)$$

The expression in equation (3) may then be solved for the following function from which the average task duration (A) may be calculated:

$$A = \frac{2Ln \pm \sqrt{(2Ln)^2 - 4(n^2 - n)L^2}}{2(n^2 - n)} \quad (4)$$

In another example, the relationship S=3A may yield following quadratic expression: $(n^2-4n)A^2-2LnA+L^2=0$, which may be solved for the following function of the average task duration (A):

$$A = \frac{2Ln \pm \sqrt{(2Ln)^2 - 4(n^2 - 4n)L^2}}{2(n^2 - 4n)} \quad (5)$$

And in yet another example, the relationship S=1.5A may yield the following quadratic expression: $(n^2-0.25n)A^2-2LnA+L^2=0$, which may be solved for the following:

$$A = \frac{2Ln \pm \sqrt{(2Ln)^2 - 4(n^2 - .25n)L^2}}{2(n^2 - .25n)} \quad (6)$$

The task separator 802 and duration calculator 804 may perform their functions for the alpha chain, as well as any second alpha chains. Thus, the task separator and duration calculator may calculate the average duration for the closure portions and size of the project buffer for the alpha chain. The task separator and duration calculator may similarly calculate the average duration for the closure portions and size of the second buffer for each of one or more second alpha chains.

The schedule modeler 800 may further include a schedule constructor 806 configured to construct the process schedule based on the tasks, including closure and precursor portions, for the alpha and any second alpha chains, and based on the closure-portion average durations and buffer sizes for the respective chains. The task separator 802 may communicate the closure and precursor portions for the alpha and any second alpha chains to the schedule modeler; and the duration calculator 804 may communicate the closure-portion average durations and buffer sizes for the respective chains.

In one example, the schedule constructor 806 may sequence the closure portions and buffer for each chain according to their average duration and buffer size, without intervening precursor portions, and with the buffer being sequenced (temporally) after the last closure portion of the chain. In various examples, this sequence of closure tasks for the alpha chain may function as a constraint to a planning model for the process. To complete the schedule, however, the schedule constructor may prepend precursor portions to respective closure portions. These precursor portions may then be connected back to the closure portion of the task that produces their respective first effective inputs.

Returning to FIG. 3, in one example, the process schedule constructed by the schedule modeler 306 (e.g., schedule modeler 800) may be expressed as a Gantt chart or other similar chart or diagram. FIG. 10 illustrates one suitable Gantt chart 1000 for an alpha chain of tasks. As shown, the chart illustrates an alpha chain including a sequence of closure portions 1002 sized according to their calculated average duration, and an appended first buffer 1004 sized according to its calculated size. The chart also includes precursor portions 1006 prepended to respective closure portions and connected back to the respective tasks that produce their respective first effective inputs. This may enable the schedule to account for the greater uncertainty in precursor portions relative to closure portions.

Similar to FIG. 10, FIG. 11 illustrates one suitable Gantt chart 1100 for an alpha chain of tasks, but in the context of phased, rolling wave planning. As shown, the chart may includes overlapping planning phases that may include primary phases 1102 each of which may includes a number of sub-phases 1104. The phases and respective sub-phases may include tasks for which an alpha chain may be formed. As shown, similar to before, the alpha chain may include a sequence of closure portions 1106 to which precursor portions 1108 may be prepended. In various examples, a project may be planned on a rolling, phase basis only to the detail necessary to execute a current phase. Details for later phases (or sub-phases) that may be initially unknown and later added as they emerge, using a rolling wave approach. As shown, these later phases (or sub-phases) may be tied back to earlier phases such as by precursor portions of appropriate tasks.

As indicated above, the process-planning system 300 may further include a plan modeler 308 configured to construct a plan model based on a process and its schedule. In one example, the total-ordering system 304 or schedule modeler 306 may communicate process-related information (e.g., network) for a total-ordered process to the plan modeler, and the schedule modeler may communicate the process schedule to the plan modeler. The plan modeler then may compile the process-related information, plan schedule and any other appropriate information into a plan model. In one example, this other appropriate information may include resource-related information that describes resources and policy constraints on the process. Resource-related information may include, for example, manpower requirements and manpower availability, factory floor space availability, tooling requirements and/or any other resources required to execute the process. In various examples, the plan modeler may assign resources to execute the process, and may identify any potential conflicts or other issues that may arise during execution of the process. For example, the plan modeler may determine if a task requires a quantity of a particular resource greater than an amount that is currently available. In another example, the plan modeler may forecast a completion date for the process that exceeds its predetermined end date (e.g., milestone). These conflicts/issues may be communicated to appropriate personnel to facilitate their making decisions and taking various remedial actions.

According to example implementations of the present disclosure, the process-planning system 300 and its subsystems including the process-construction system 302, total-ordering system 304, schedule modeler 306 and plan modeler 308 may be implemented by various means. Similarly, the examples of a total-ordering system 600, 700, and schedule modeler 800, including each of their respective elements, may be implemented by various means according to example implementations. Means for implementing the systems, subsystems and their respective elements may include hardware, alone or under direction of one or more computer program code instructions, program instructions or executable computer-readable program code instructions from a computer-readable storage medium.

In one example, one or more apparatuses may be provided that are configured to function as or otherwise implement the systems, subsystems and respective elements shown and described herein. In examples involving more than one apparatus, the respective apparatuses may be connected to or otherwise in communication with one another in a number of different manners, such as directly or indirectly via a wireline or wireless network or the like.

Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, a processor (e.g., processor unit) connected to a memory (e.g., storage device).

The processor is generally any piece of hardware that is capable of processing information such as, for example, data, computer-readable program code, instructions or the like (generally "computer programs," e.g., software, firmware, etc.), and/or other suitable electronic information. More particularly, for example, the processor may be configured to execute computer programs, which may be stored onboard the processor or otherwise stored in the memory (of the same or another apparatus). The processor may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory is generally any piece of hardware that is capable of storing information such as, for example, data, computer programs and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium which, as a non-transitory device capable of storing information, may be distinguishable from computer-readable transmission media such as electronic transitory signals capable of carrying information from one location to another. Computer-readable medium as described herein may generally refer to a computer-readable storage medium or computer-readable transmission medium.

In addition to the memory, the processor may also be connected to one or more interfaces for displaying, transmitting and/or receiving information. The interfaces may include a communications interface (e.g., communications unit) and/or one or more user interfaces. The communications interface may be configured to transmit and/or receive information, such as to and/or from other apparatus(es), network(s) or the like. The communications interface may be configured to transmit and/or receive information by physical (wireline) and/or wireless communications links. Examples of suitable communication interfaces include a network interface controller (NIC), wireless NIC (WNIC) or the like.

The user interfaces may include a display and/or one or more user input interfaces (e.g., input/output unit). The display may be configured to present or otherwise display information to a user, suitable examples of which include a liquid crystal display (LCD), light-emitting diode display (LED), plasma display panel (PDP) or the like. The user input interfaces may be wireline or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of the systems, subsystems and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. It will also be understood that one or more functions, and combinations of functions, may be implemented by special purpose hardware-based computer systems and/or processors which perform the specified functions, or combinations of special purpose hardware and program code instructions.

As explained above, example implementations of the present disclosure provide a system and method to establish alpha-chain constraints from a process into a planning environment using a construct that models the stochastic nature of tasks. The use of alpha-chain constraints (instead of the schedule-based constraints in schedule-based planning tool/ environments) may facilitate the automated generation of process plans. Process plans based on such alpha-chain constraints may have a number of advantages. These process plans may be robust with regard to the sources of uncertainty and variation that undermine schedule-based plans, which may therefore require fewer planning cycles. These process plans may also result in faster planning cycles since the non-value added efforts to resolve conflicts over schedule and effort estimates may be eliminated. These process plans may also result in reusable baselines for planning since relationships that may be captured according to example implementations may be used as a basis for similar projects. The negative effects of schedule-driven metrics on development process integration may be reduced if not eliminated, as may the inefficiency and costs associated with repeated cycles of non-robust schedule-based planning.

The process plans based on alpha-chain constraints may also be better predictive models. Since precursor portions may contain more uncertainty than closure portions, alpha chains of closure portions may be more representative of the dependencies that govern progress. In various examples, the system may only require task duration estimates for closure portions, which may be made after resource managers have evaluated the effects of resource constraints. In addition, alpha-chain constraints may provide a natural basis for the prioritization of tasks that require common resources, so that multitasking does not degrade performance of the resource management system.

Many modifications and other implementations of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific example implementations provided herein and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for implementation of an process-planning system, the apparatus comprising a processor and a memory storing executable instructions that in response to execution by the processor, cause the apparatus to implement at least:
    a schedule modeler configured to receive process-related information describing a process for production of a product, the process-related information describing a logical sequence of tasks to produce respective internal products of the process, at least some of the tasks having a precedence relationship whereby the internal product produced by one task is an input utilized or required by another task,
    wherein the schedule modeler is also configured to construct a schedule for the process based on the process-related information, the process schedule being for execution of at least some of the tasks each of which utilizes or requires one or more inputs including temporally at least a last input, the schedule modeler including:
        a task separator configured to separate each of at least some of the respective tasks into a closure portion that requires availability of the last input of its task before being initiated, and a distinct precursor portion capable of being initiated before the respective last input is available; and
        a scheduler constructor configured to temporally sequence the closure portions of the respective tasks without intervening precursor portions, and prepend the precursor portions to respective, temporally-sequenced closure portions.

2. The apparatus of claim 1, wherein the schedule modeler further includes a duration calculator configured to calculate an average duration for the closure portions based on a timeframe constraint, and
    wherein the scheduler constructor is configured to temporally sequence the closure portions according to the calculated average duration.

3. The apparatus of claim 2, wherein the duration calculator is also configured to calculate a size of a buffer corresponding to its duration, and
    wherein scheduler constructor is further configured to temporally sequence the buffer after a last of the closure portions.

4. The apparatus of claim 2, wherein the closure portions have respective durations based on which the average duration is calculated, the durations being expressed as unknown probability distributions.

5. The apparatus of claim 1, wherein the tasks are arranged in a plurality of chains of logically-sequenced tasks, and
    wherein the task separator is configured to separate the respective tasks, and schedule constructor is configured to temporally sequence the closure portions and prepend the precursor portions, for each of the chains.

6. The apparatus of claim 1, wherein the memory stores further executable instructions that, in response to execution by the processor, cause the apparatus to further implement:
a plan modeler configured to compile at least the process-related information and plan schedule into a plan model.

7. The apparatus of claim 1, wherein the memory stores further executable instructions that, in response to execution by the processor, cause the apparatus to further implement:
a total-ordering system coupled to the schedule modeler and configured to establish total-ordering in the process, the received process-related information based on which the schedule is constructed being for the total-ordered process.

8. A method comprising:
receiving process-related information describing a process for production of a product, the process-related information describing a logical sequence of tasks to produce respective internal products of the process, at least some of the tasks having a precedence relationship whereby the internal product produced by one task is an input utilized or required by another task; and
constructing a schedule for the process based on the process-related information, the process schedule being for execution of at least some of the tasks each of which utilizes or requires one or more inputs including temporally at least a last input, construction of the process schedule including:
separating each of at least some of the respective tasks into a closure portion that requires availability of the last input of its task before being initiated, and a distinct precursor portion capable of being initiated before the respective last input is available;
temporally sequencing the closure portions of the respective tasks without intervening precursor portions; and
prepending the precursor portions to respective, temporally-sequenced closure portions.

9. The method of claim 8, wherein constructing the process schedule further comprises calculating an average duration for the closure portions based on a time-frame constraint, and
wherein the closure portions are temporally sequenced according to the calculated average duration.

10. The method of claim 9, wherein calculating the average duration also includes calculating a size of a buffer corresponding to its duration, and
wherein temporally sequencing the closure portions further includes temporally sequencing the buffer after a last of the closure portions.

11. The method of claim 9, wherein the closure portions have respective durations based on which the average duration is calculated, the durations being expressed as unknown probability distributions.

12. The method of claim 8, wherein the tasks are arranged in a plurality of chains of logically-sequenced tasks, and
wherein construction of the process schedule includes separating the respective tasks, temporally sequencing the closure portions and prepending the precursor portions for each of the chains.

13. The method of claim 8 further comprising:
compiling at least the process-related information and plan schedule into a plan model.

14. The method of claim 8 further comprising:
establishing total-ordering in the process, the received process-related information based on which the schedule is constructed being for the total-ordered process.

15. A computer-readable storage medium that is non-transitory and has computer-readable program code portions stored therein that, in response to execution by a processor, cause an apparatus to at least:
receive process-related information describing a process for production of a product, the process-related information describing a logical sequence of tasks to produce respective internal products of the process, at least some of the tasks having a precedence relationship whereby the internal product produced by one task is an input utilized or required by another task; and
construct a schedule for the process based on the process-related information, the process schedule being for execution of at least some of the tasks each of which utilizes or requires one or more inputs including temporally at least a last input, construction of the process schedule including the apparatus being caused to at least:
separate each of at least some of the respective tasks into a closure portion that requires availability of the last input of its task before being initiated, and a distinct precursor portion capable of being initiated before the respective last input is available;
temporally sequence the closure portions of the respective tasks without intervening precursor portions; and
prepend the precursor portions to respective, temporally-sequenced closure portions.

16. The computer-readable storage medium of claim 15, wherein the apparatus being caused to construct the process schedule further includes being caused to calculate an average duration for the closure portions based on a time-frame constraint, and
wherein the apparatus is caused to temporally sequence the closure portions according to the calculated average duration.

17. The computer-readable storage medium of claim 16, wherein the apparatus being caused to calculate the average duration also includes being caused to calculate a size of a buffer corresponding to its duration, and
wherein the apparatus being caused to temporally sequence the closure portions further includes being caused to temporally sequence the buffer after a last of the closure portions.

18. The computer-readable storage medium of claim 16, wherein the closure portions have respective durations based on which the average duration is calculated, the durations being expressed as unknown probability distributions.

19. The computer-readable storage medium of claim 15, wherein the tasks are arranged in a plurality of chains of logically-sequenced tasks, and
wherein construction of the process schedule includes the apparatus being caused to separate the respective tasks, temporally sequence the closure portions and prepend the precursor portions for each of the chains.

20. The computer-readable storage medium of claim 15 having further computer-readable program code portions stored therein that, in response to execution by the processor, cause the apparatus to further:
compile at least the process-related information and plan schedule into a plan model.

21. The computer-readable storage medium of claim 15 having further computer-readable program code portions stored therein that, in response to execution by the processor, cause the apparatus to further:
establish total-ordering in the process, the received process-related information based on which the schedule is constructed being for the total-ordered process.

22. The apparatus of claim 1, wherein each of the tasks is composed of one or more activities, and for each of the at least some of the respective tasks separated into a closure portion and distinct precursor portion, each of the closure portion and precursor portion is composed of one or more activities of its task.

23. The apparatus of claim 1, wherein the tasks are arranged in a plurality of chains, a first chain of which includes strictly-ordered tasks without flexibility in their order, and a second chain of which includes tasks with at least some flexibility in their order, and wherein the apparatus is caused to separate each of at least some of the respective tasks, and temporally sequence the closure portions, on a per-chain basis.

24. The apparatus of claim 23, wherein the memory stores further executable instructions that in response to execution by the processor cause the apparatus to further:

compile at least the process-related information and plan schedule into a plan model, wherein the temporally-sequenced closure portions for the first chain function as a constraint to the plan model.

\* \* \* \* \*